United States Patent
Maus et al.

(10) Patent No.: US 7,677,262 B2
(45) Date of Patent: Mar. 16, 2010

(54) SAFETY VALVE OF A HIGH PRESSURE STORAGE, IN PARTICULAR A HYDROGEN STORAGE TANK

(75) Inventors: Steffen Maus, Reutlingen (DE); David Wenger, Ulm (DE)

(73) Assignee: Daimler AG, Stuttgart (DE)

( * ) Notice: Subject to any disclaimer, the term of this patent is extended or adjusted under 35 U.S.C. 154(b) by 158 days.

(21) Appl. No.: 11/796,447

(22) Filed: Apr. 27, 2007

(65) Prior Publication Data

US 2007/0261734 A1 Nov. 15, 2007

(30) Foreign Application Priority Data

Apr. 28, 2006 (DE) .................. 10 2006 020 388

(51) Int. Cl.
*F16K 17/38* (2006.01)
*F16K 17/40* (2006.01)
*F16K 17/20* (2006.01)

(52) U.S. Cl. .................. 137/74; 137/517; 137/72
(58) Field of Classification Search .................. 137/72, 137/74, 78, 517
See application file for complete search history.

(56) References Cited

U.S. PATENT DOCUMENTS

| | | | | |
|---|---|---|---|---|
| 2,245,271 A | * | 6/1941 | Guill | 137/517 |
| 2,623,540 A | * | 12/1952 | Palermo | 137/515.5 |
| 3,113,583 A | * | 12/1963 | Fox | 137/220 |
| 3,645,479 A | * | 2/1972 | Kostroun et al. | 244/103 R |
| 3,714,964 A | * | 2/1973 | Livingston | 137/513.3 |
| 3,794,077 A | * | 2/1974 | Fanshier | 137/513.3 |
| 4,383,550 A | * | 5/1983 | Sotokazu | 137/517 |
| 5,632,297 A | * | 5/1997 | Sciullo et al. | 137/73 |
| 6,592,047 B1 | * | 7/2003 | Staley | 236/34.5 |
| 2005/0229977 A1 | | 10/2005 | Li et al. | 137/517 |
| 2006/0130901 A1 | * | 6/2006 | Jansen | 137/516.27 |

FOREIGN PATENT DOCUMENTS

| | | |
|---|---|---|
| DE | 834 144 | 3/1952 |
| DE | 102 25 003 | 12/2003 |
| EP | 0 394 673 | 10/1990 |
| EP | 1 582 788 | 10/2005 |
| FR | 2 796 701 | 1/2001 |

* cited by examiner

*Primary Examiner*—John Rivell
*Assistant Examiner*—Atif H Chaudry
(74) *Attorney, Agent, or Firm*—Davidson, Davidson & Kappel, LLC

(57) ABSTRACT

A safety valve for a compressed gas storage tank (12) includes a relief conduit (16, 18) provided for fluid connection to an interior chamber (14) of the compressed gas storage tank (12), and a closing member (22) sealing the relief conduit (16, 18); a retaining device (24) being provided which, in a normal condition, locks the closing member (22) in place and which, in safety-critical conditions, opens a cross-sectional flow area (30) in such a manner that the relief conduit (16, 18) is open to the atmosphere. In accordance with the present invention, the closing member (22) is connected to an adjustor (26) which adjusts the cross-sectional flow area (30) of the relief conduit (16, 18) as a function of an upstream interior pressure.

3 Claims, 2 Drawing Sheets

SAFETY VALVE OF A HIGH PRESSURE STORAGE, IN PARTICULAR A HYDROGEN STORAGE TANK

This application claims priority to German Patent Application DE 10 2006 020 388.7, filed Apr. 28, 2006, the entire disclosure of which is hereby incorporated by reference herein.

BACKGROUND

The present invention relates to a safety valve of a high-pressure storage tank, in particular of a hydrogen storage tank.

It is known that one can store hydrogen in gaseous form in pressurized storage tanks at a pressure of several hundred bar above atmospheric pressure. The advantage of compressed gas storage tanks is their relatively low weight for a given storage volume.

European Patent Application EP 0 394 673 A1 discloses a valve which prevents excessive mass flow out of a gas cylinder by closing a discharge opening with a ball. Further outflow is then only possible through a leakage conduit of small cross-sectional area.

German Laid Open Application DE 102 25 003 A1 describes a safety valve for a gas container, including a disk valve which can be moved by a motor actuator.

In compressed gas storage tanks, it is common to employ safety valves which allow the contents to be released in safety-critical situations, for example in the event of a fire. In such cases, retaining means in the form of fusible safety devices are released, thereby opening a relief conduit which is securely closed in the normal condition. Such retaining means can be, for example, rings which melt at excessive temperatures, thereby releasing a closing member and opening the relief conduit. In the event of a fire, the resulting large mass flow can be critical.

SUMMARY OF THE INVENTION

It is an object of the present invention to provide a safety valve for a gas container, which, when triggered, releases only a controllable mass flow of gas.

The present invention provides a safety valve for a compressed gas storage tank, in particular a compressed hydrogen storage tank, includes a relief conduit provided for fluid connection to an interior chamber of the compressed gas storage tank, and a closing member sealing the relief conduit; a retaining means being provided which, in a normal condition, locks the closing member in place and which, in safety-critical conditions, opens a cross-sectional flow area in such a manner that the relief conduit is open to the atmosphere. The closing member is connected to an adjusting device which adjusts the cross-sectional flow area of the relief conduit as a function of an upstream pressure in the interior chamber of the compressed gas storage tank.

In the event of a fire, the advantage is that the gas, in particular the hydrogen, is released at a constant and defined mass flow rate. The release of gas takes place in a controlled manner, in particular in a spatially controlled manner, preventing an excessive local concentration of hydrogen. The maximum rate at which hydrogen can be released is always reliably maintained at a level below the explosive limit of hydrogen.

The cross-sectional flow area is preferably selected according to the gas mass in the compressed gas storage tank and a targeted time of emptying to a defined residual pressure in the compressed gas storage tank. The emptying time depends mainly on the cross-sectional flow area and the pressure inside the storage tank. Without the safety valve of the present invention, the mass flow rate would change considerably during emptying due to the decreasing interior pressure.

The adjusting device can be in the form of a compression spring which provides resistance to opening movement of the closing member.

Alternatively, the adjusting device can be in the form of a tension spring which provides resistance to opening movement of the closing member.

Preferably, the cross-sectional flow area is small when the upstream pressure is high, and large when the upstream pressure is low. Thus, preferably, a constant mass flow rate can be ensured during the outflow of the gas. In the case of hydrogen, the mass flow rate can be adjusted such that it remains below the explosive limit, and that, for example, it can be burned off in a defined manner.

Preferably, the cross-sectional flow area changes in such a manner that an outgoing mass flow is substantially constant.

To this end, the cross-sectional flow area can increase in the manner of a cone, so that the available cross-sectional flow area increases as the upstream pressure in the compressed gas storage tank decreases during progressive emptying, the appropriate cross-sectional flow area being adjusted be the adjusting device.

The adjusting device can itself be located in the relief conduit, and its position, which is dependent on the upstream pressure, can adjust the size of the cross-sectional flow area by filling the cross-sectional flow area with its body to a greater or lesser degree. Thus, when the upstream pressure is high, the adjusting device can fill most of the relief conduit with its body in such a way that there is only a small effective cross-sectional flow area available, while when the upstream pressure decreases, the adjusting device can fill less of the relief conduit, so that a larger effective cross-sectional flow area is available. This allows for easy adjustment of the mass flow rate of the outflowing gas.

To prevent blocking of the safety valve, for example, in the event of a failure of the adjusting device (for example, a compression or tension spring), a stop can be provided which ensures that a minimum cross-sectional flow area is opened so that the release of the contents of the compressed gas storage tank is also guaranteed under such circumstances.

BRIEF DESCRIPTION OF THE DRAWINGS

Further advantages and details of the present invention will be described in more detail below with reference to an exemplary embodiment illustrated in the drawing, without being limited thereto.

In the schematic drawings.

DETAILED DESCRIPTION

Figure 1:
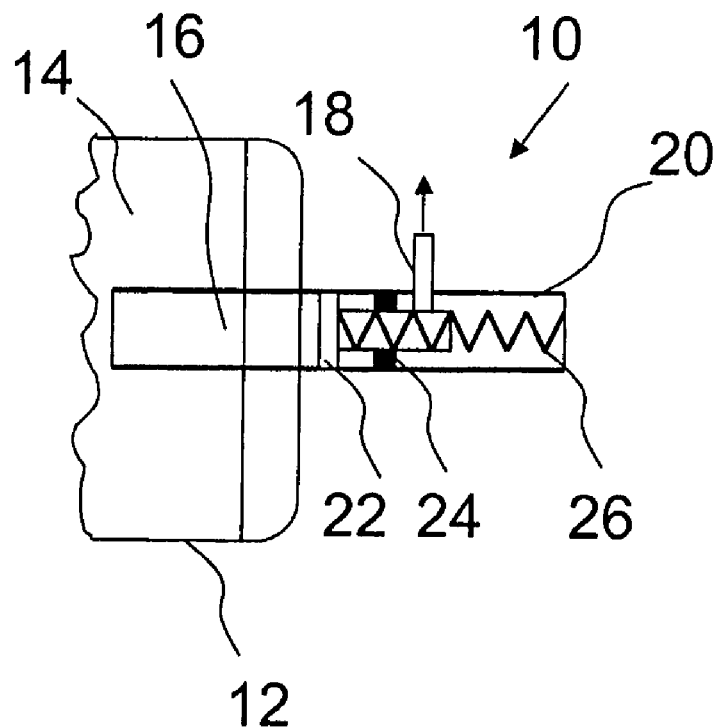
FIG. 1 shows a first preferred embodiment of a safety valve with a compression spring as the adjusting device.

In the Figures, like reference numerals are used to denote functionally like parts.

Figure 2:
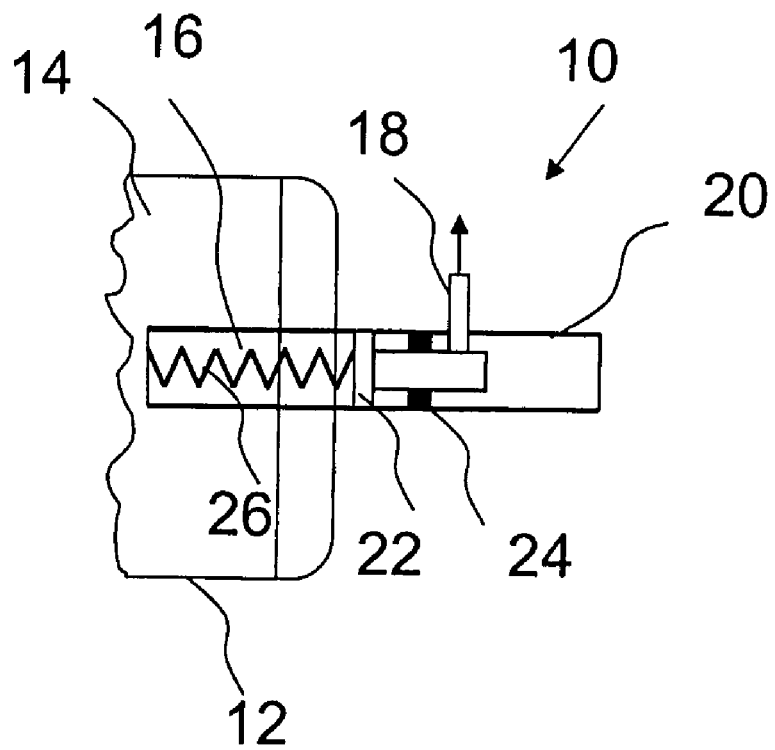
FIG. 2 shows a second preferred embodiment of a safety valve with a tension spring as the adjusting device.

In FIGS. 1 and 2, a safety valve 10 for a compressed gas storage tank 12 is shown in a very simplified manner to illustrate the present invention. Safety valve 10 has a relief conduit 16, 18 made up of two sections and located in a valve housing 20, the first section of relief conduit 16 pointing into an interior chamber 14 of compressed gas storage tank 12 and the second section of relief conduit 18 pointing outward.

Relief conduit 16, 18 is sealed by a closing member 22, which is illustrated in FIGS. 1 and 2 as a horizontal T. In the normal condition, closing member 22 is locked in place by a retaining device 24. In safety-critical conditions, retaining device 24, which is preferably in the form of a fusible member, releases closing member 22, thereby opening a cross-sectional flow area 30 in such a manner that gas can be released from compressed gas storage tank 12 to the atmosphere via relief conduit 16, 18.

Closing member 22 is further connected to an adjusting device 26 which changes the cross-sectional flow area 30 (See FIG. 3a, 3b) of relief conduit 16, 18 as a function of an upstream pressure in the interior chamber of compressed gas storage tank 12.

FIG. 1 shows a variant in which adjusting device 26 is in the form of a compression spring which provides resistance to opening movement of closing member 22. If, in the event of a fire, retaining means 24 melts, the gas in interior chamber 14 presses closing member 22 to the right in FIG. 1, thus opening the second section of relief conduit 18.

FIG. 2 shows a variant in which adjusting device 26 is in the form of a tension spring which provides resistance to opening movement of closing member 22 when the closing member is no longer locked in place by retaining device 24.

In both cases, the spring force can cause closing member 22 to travel a distance that is dependent on the upstream pressure. If the valve housing is suitably shaped in the area of the relief conduit, the cross-sectional flow area thereof can be changed in such a way that that an outgoing mass flow is substantially constant.

Figure 3A:
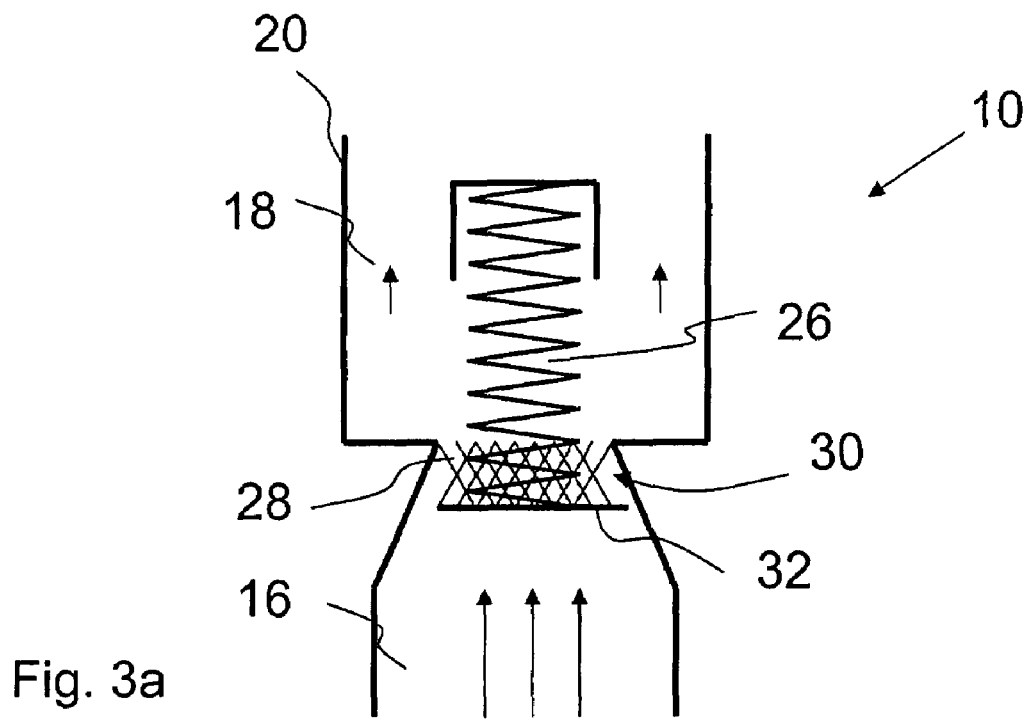
FIGS. 3a, b show a preferred safety valve at a high upstream pressure (a) and at a low upstream pressure (b).
Figure 3B:
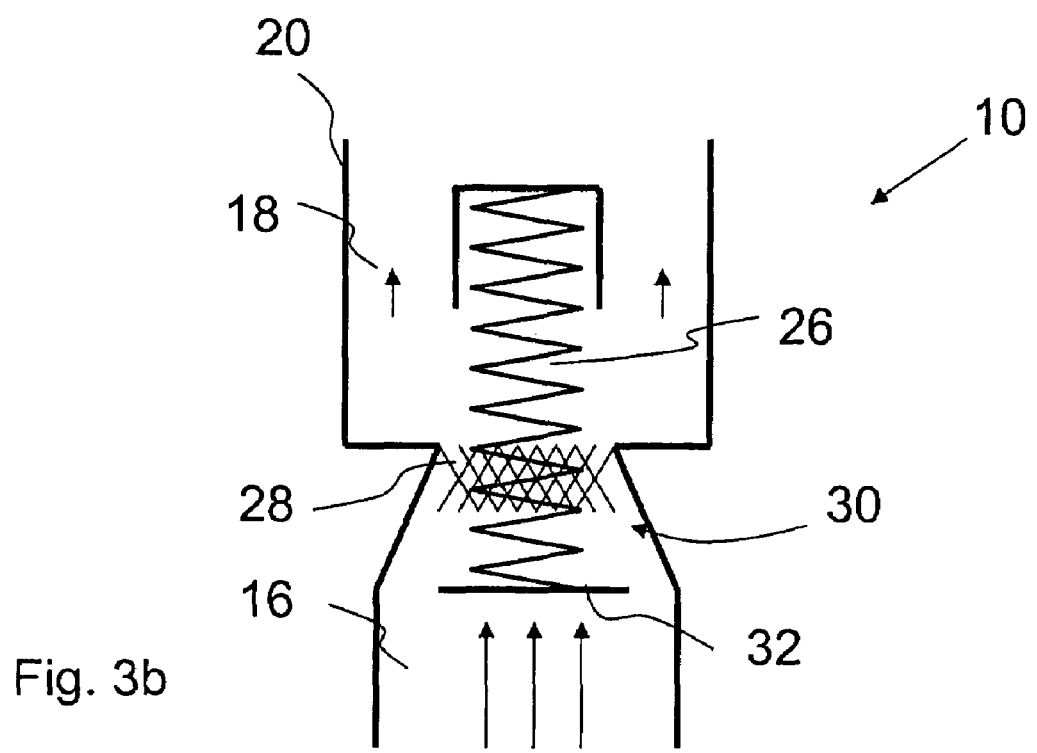

FIGS. 3a and 3b are detail views showing an example of a preferred safety valve 10 during emptying. Between the first section of relief conduit 16 and the second section of relief conduit 18, the cross-section tapers in the direction of flow in the manner of a cone. In the tapering region, there is inserted an element 28 which may be, for example, a foam, a mesh, a perforated plate, or the like, in order to provide a defined minimum cross-sectional flow area in the manner of a stop. The flow direction of the exiting gas is indicated by upwardly directed arrows.

In FIG. 3a, the upstream pressure is high at the beginning of the emptying process. Adjusting device 26, which is in the form of a compression spring, presses a valve plate 32 against the oncoming gas flow. The cross-sectional flow area 30 opened for the gas annularly surrounds valve plate 32 and is relatively small.

FIG. 3b shows a situation during progressive emptying when the upstream pressure has decreased. Adjusting device 26, which is in the form of a compression spring, can now open the valve plate 32 further, so that cross-sectional flow area 30 is increased and a substantially constant mass flow exits through the second section of relief conduit 18, as compared to the beginning of the emptying process.

Known safety valves can be equipped with the preferred adjusting device 26 in a quite simple manner, and be easily adapted for this use. Safety valve 10 is particularly preferred for use in a compressed gas storage tank 12 for storing hydrogen at a storage pressure of several hundred bar.

What is claimed is:

1. A safety valve for a compressed gas storage tank comprising:
   a relief conduit for fluid connection to an interior chamber of a compressed gas storage tank and having a cross-sectional flow area in safety-critical conditions;
   a closing member sealing the relief conduit;
   a retaining device, the retaining device in a normal condition locking the closing member in place and, in safety-critical conditions, opening the relief conduit to the atmosphere, and
   an adjustor connected to the closing member and located in a fluid flow path within the relief conduit for adjusting the cross-sectional flow area as a function of an upstream interior pressure; and
   a stop inside the relief conduit capable of providing a defined minimum cross-section area of the cross-sectional flow area in which gas can flow in safety-critical conditions.

2. The safety valve as recited in claim 1 wherein the stop includes a porous material.

3. The safety valve as recited in claim 2 wherein the porous material is a mesh, a foam, or a perforated plate.

* * * * *